United States Patent
Balin et al.

(10) Patent No.: US 12,147,524 B2
(45) Date of Patent: Nov. 19, 2024

(54) HARDWARE SYSTEM PROTECTION USING VERIFICATION OF HARDWARE DIGITAL IDENTITY VALUES

(71) Applicant: EMC IP Holding Company LLC, Hopkinton, MA (US)

(72) Inventors: Maxim Balin, Gan Yavne (IL); Tomer Shachar, Omer (IL); Yevgeni Gehtman, Modi'in (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 37 days.

(21) Appl. No.: 17/105,749

(22) Filed: Nov. 27, 2020

(65) Prior Publication Data

US 2022/0171840 A1      Jun. 2, 2022

(51) Int. Cl.
*G06F 21/00*       (2013.01)
*G06F 21/44*       (2013.01)
*G06F 21/73*       (2013.01)

(52) U.S. Cl.
CPC ............. *G06F 21/44* (2013.01); *G06F 21/73* (2013.01)

(58) Field of Classification Search
CPC .................................. G06F 21/44; G06F 21/73
See application file for complete search history.

(56) References Cited

U.S. PATENT DOCUMENTS

| | | | | |
|---|---|---|---|---|
| 10,311,224 B1* | 6/2019 | Farhan | .................. | H04L 9/3236 |
| 11,036,707 B2* | 6/2021 | Stewart | ............... | G06F 16/2272 |
| 2005/0216760 A1 | 9/2005 | Rabin | | |
| 2008/0068153 A1* | 3/2008 | Doan | ...................... | G06F 21/35 340/572.1 |
| 2008/0269938 A1* | 10/2008 | Meaney | ................. | G06Q 99/00 700/116 |
| 2010/0285834 A1 | 11/2010 | Hutchinson et al. | | |

(Continued)

FOREIGN PATENT DOCUMENTS

WO    WO-2017116303 A1 *    7/2017

OTHER PUBLICATIONS https://www.hindawi.com/journals/wcmc/2020/7346763/.

(Continued)

*Primary Examiner* — Rodman Alexander Mahmoudi
(74) *Attorney, Agent, or Firm* — Ryan, Mason & Lewis, LLP

(57) ABSTRACT

Techniques are provided for hardware system protection using verification of hardware digital identity values. One method comprises obtaining a first hardware digital identity value for a hardware system, wherein the first hardware digital identity value aggregates hardware identifiers of a plurality of hardware components in the hardware system at a first time; comparing a second hardware digital identity value to the first hardware digital identity value, wherein the second hardware digital identity value aggregates hardware identifiers of the hardware components in the hardware system at a second time subsequent to the first time; and performing an automated remedial action based on a result of the comparison. The comparison may be performed: (i) when the hardware system attempts to connect to at least one service over a network, and/or (ii) when the hardware system is installed, configured and/or activated at a remote location.

20 Claims, 6 Drawing Sheets

(56) References Cited

U.S. PATENT DOCUMENTS

| | | | |
|---|---|---|---|
| 2015/0113638 A1* | 4/2015 | Valasek | G06F 21/562 |
| | | | 726/22 |
| 2016/0232772 A1 | 8/2016 | Shechter et al. | |
| 2018/0026800 A1* | 1/2018 | Munoz | H03M 7/4081 |
| | | | 713/156 |
| 2018/0205560 A1* | 7/2018 | Park | H04L 9/3247 |
| 2019/0394050 A1* | 12/2019 | Goeringer | H04L 9/3263 |
| 2020/0358763 A1 | 11/2020 | Kii et al. | |
| 2021/0173926 A1 | 6/2021 | Slipenchuk et al. | |
| 2023/0275749 A1* | 8/2023 | Shin | G06F 21/44 |
| | | | 713/156 |

OTHER PUBLICATIONS http://aceproject.org/main/english/et/ete05a.htm.
https://docs.bmc.com/docs/TrueSightNetworkAutomation/89/managing-detailed-hardware-inventory-808130256.html.
https://www.cisco.com/c/en/us/td/docs/routers/crs/software/crs_r4-3/system_management/configuration/guide/b_sysman_cg43crs/b_sysman_cg43crs_chapter_0101.html.
http://www.kroening.com/papers/ISVLSI2015-1.pdf.
U.S. Appl. No. 17/210,799, entitled, "System Protection Using Verification of Software Digital Identity Values", filed Mar. 24, 2021.

* cited by examiner

HARDWARE SYSTEM PROTECTION USING VERIFICATION OF HARDWARE DIGITAL IDENTITY VALUES

FIELD

The field relates generally to information processing systems, and more particularly to the protection of such information processing systems.

BACKGROUND

A supply chain involves the flow of raw materials, goods and/or services from a point of origin (such as a manufacturer or vendor) to a point of consumption, such as a customer or other end user. A supply chain can be a target for cybercriminals and other malicious actors. The supply chain of a given company can include third-party entities, such as manufacturers, suppliers, handlers, shippers and purchasers. A weak link in the supply chain can allow a malicious actor to access desired data from an organization. For example, a malicious actor can embed malicious software and/or hardware in a storage product before the storage product arrives at a customer data center.

A need exists for improved techniques for protecting a hardware system, for example, while the hardware system is in the supply chain.

SUMMARY

In one embodiment, a method comprises obtaining a first hardware digital identity value for a hardware system, wherein the first hardware digital identity value is based at least in part on a first aggregation of hardware identifiers of a plurality of hardware components in the hardware system at a first time; comparing a second hardware digital identity value to the first hardware digital identity value, wherein the second hardware digital identity value is based at least in part on a second aggregation of the hardware identifiers of the hardware components in the hardware system at a second time that is subsequent to the first time; and performing one or more automated remedial actions based at least in part on a result of the comparison.

In some embodiments, the comparison may be performed at a time corresponding to: (i) the hardware system attempting to connect to at least one service over a network and/or (ii) the hardware system being installed, configured and/or activated at a location remote from a provider of the hardware system. The first aggregation and/or the second aggregation of the hardware identifiers may comprise, for example, digitally signing a serial number of one or more hardware components and/or hashing a serial number of one or more hardware components.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for hardware system protection using verification of hardware digital identity values.

In one or more embodiments, the disclosed hardware system protection techniques allow a customer, for example, to have confidence in the integrity of the hardware system. The hardware digital identity value of a given protected hardware system can be validated to determine if any changes were made to the hardware system, for example, during a supply chain process.

In at least some embodiments, verification and integrity validation techniques are provided to protect hardware systems. The use of a hardware digital identity value, discussed further below, for every protected hardware system, allows any unauthorized, rouge and/or malicious hardware changes to the protected hardware system during transportation or other handling in the supply chain to be identified. In this manner, the hardware digital identity value can be used to verify and authenticate that no unauthorized and/or malicious changes were made to the protected hardware system, such as a storage system, during the transportation phase or another portion of the supply chain.

Figure 1:
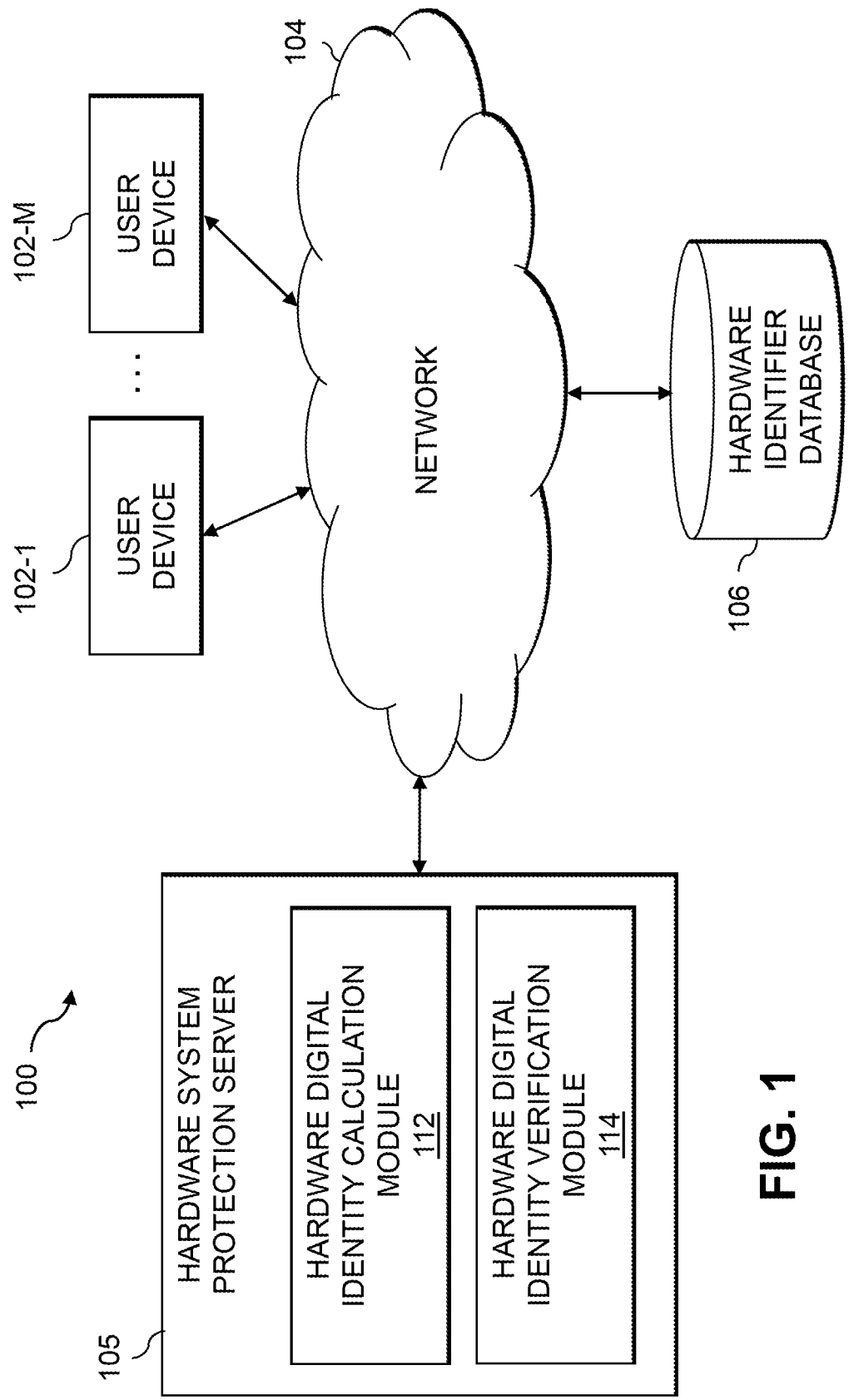
FIG. 1 illustrates an information processing system configured for hardware system protection using verification of hardware digital identity values in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is hardware system protection server 105 and hardware identifier database 106, discussed below.

The user devices 102 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 102 may comprise a network client that includes networking capabilities such as ethernet, Wi-Fi, etc. When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input-output (IO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The hardware system protection server 105 may be implemented, for example, on the cloud or on the premises of an enterprise or another entity. In some embodiments, the hardware system protection server 105, or portions thereof, may be implemented as part of a storage system or on a host device. As also depicted in FIG. 1, the hardware system protection server 105 further comprises a hardware digital identity calculation module 112 and a hardware digital identity verification module 114.

It is to be appreciated that this particular arrangement of modules 112 and 114 illustrated in the hardware system protection server 105 of the FIG. 1 embodiment is presented by way of example only, and alternative arrangements can be used in other embodiments. For example, the functionality associated with modules 112 and 114 in other embodiments can be combined into a single module, or separated across a larger number of modules. As another example, multiple distinct processors can be used to implement different ones of modules 112 and 114 or portions thereof.

At least portions of modules 112 and 114 may be implemented at least in part in the form of software that is stored in memory and executed by a processor. An exemplary process utilizing modules 112 and 114 of an example hardware system protection server 105 in computer network 100 will be described in more detail with reference to the flow diagrams of, for example, FIGS. 3 and 4.

Additionally, the hardware system protection server 105 can have an associated hardware identifier database 106 configured to store, for example, hardware digital identity values pertaining to one or more exemplary hardware systems that may be protected using the disclosed techniques for hardware system protection.

The hardware identifier database 106 in the present embodiment is implemented using one or more storage systems associated with the hardware system protection server 105. Such storage systems can comprise any of a variety of different types of storage including such as network-attached storage (NAS), storage area networks (SANs), direct-attached storage (DAS) and distributed DAS, as well as combinations of these and other storage types, including software-defined storage.

The user devices 102 and the hardware system protection server 105 may be implemented on a common processing platform, or on separate processing platforms. The user devices 102 (for example, when implemented as host devices) are illustratively configured to write data to and read data to/from the storage system in accordance with applications executing on those host devices for system users.

One or more of the protected hardware systems may comprise storage devices of a storage system. The storage devices illustratively comprise solid state drives (SSDs). Such SSDs are implemented using non-volatile memory (NVM) devices such as flash memory. Other types of NVM devices that can be used to implement at least a portion of the storage devices 122 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system.

It is therefore to be appreciated that numerous different types of storage devices can be protected in other embodiments. For example, a given storage system can include a combination of different types of protected storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS (content-addressable storage) systems, distributed storage systems, or storage systems based on flash memory or other types of NVM storage devices. A given storage system as the term is broadly used herein can comprise, for example, any type of system comprising multiple storage devices, such as NAS, SANs, DAS and distributed DAS, as well as combinations of these and other storage types, including software-defined storage.

In some embodiments, communications between the user devices 102 over the network 104 with the hardware system protection server 105 may comprise IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The user devices 102 are configured to interact over the network 104 with the hardware system protection server 105 and/or storage devices. Such interaction illustratively includes generating IO operations, such as write and read requests, and sending such requests over the network 104 for processing by the hardware system protection server 105. In some embodiments, each of the user devices 102 comprises a multi-path input-output (MPIO) driver configured to control delivery of IO operations from the host device to a storage system over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of a storage system. The MPIO driver may comprise, for example, an otherwise conventional MPIO driver, such as a PowerPath® driver from Dell EMC. Other types of MPIO drivers from other driver vendors may be used.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using interne protocol (IP) or other related communication protocols.

Also associated with the hardware system protection server 105 can be one or more input-output devices (not shown), which illustratively comprise keyboards, displays or other types of input-output devices in any combination. Such input-output devices can be used, for example, to support one or more user interfaces to the hardware system protection server 105, as well as to support communication between the hardware system protection server 105 and other related systems and devices not explicitly shown.

The user devices 102 and the hardware system protection server 105 in the FIG. 1 embodiment are assumed to be implemented using at least one processing device. Each such processing device generally comprises at least one processor and an associated memory, and implements one or more functional modules for controlling certain features of the hardware system protection server 105.

More particularly, user devices 102 and hardware system protection server 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the user devices 102 and/or the hardware system protection server 105 to communicate over the network 104 with each other (as well as one or more other networked devices), and illustratively comprises one or more conventional transceivers.

It is to be understood that the particular set of elements shown in FIG. 1 for hardware system protection using verification of hardware digital identity values is presented by way of illustrative example only, and in other embodiments additional or alternative elements may be used. Thus, another embodiment includes additional or alternative systems, devices and other network entities, as well as different arrangements of modules and other components.

Figure 2:
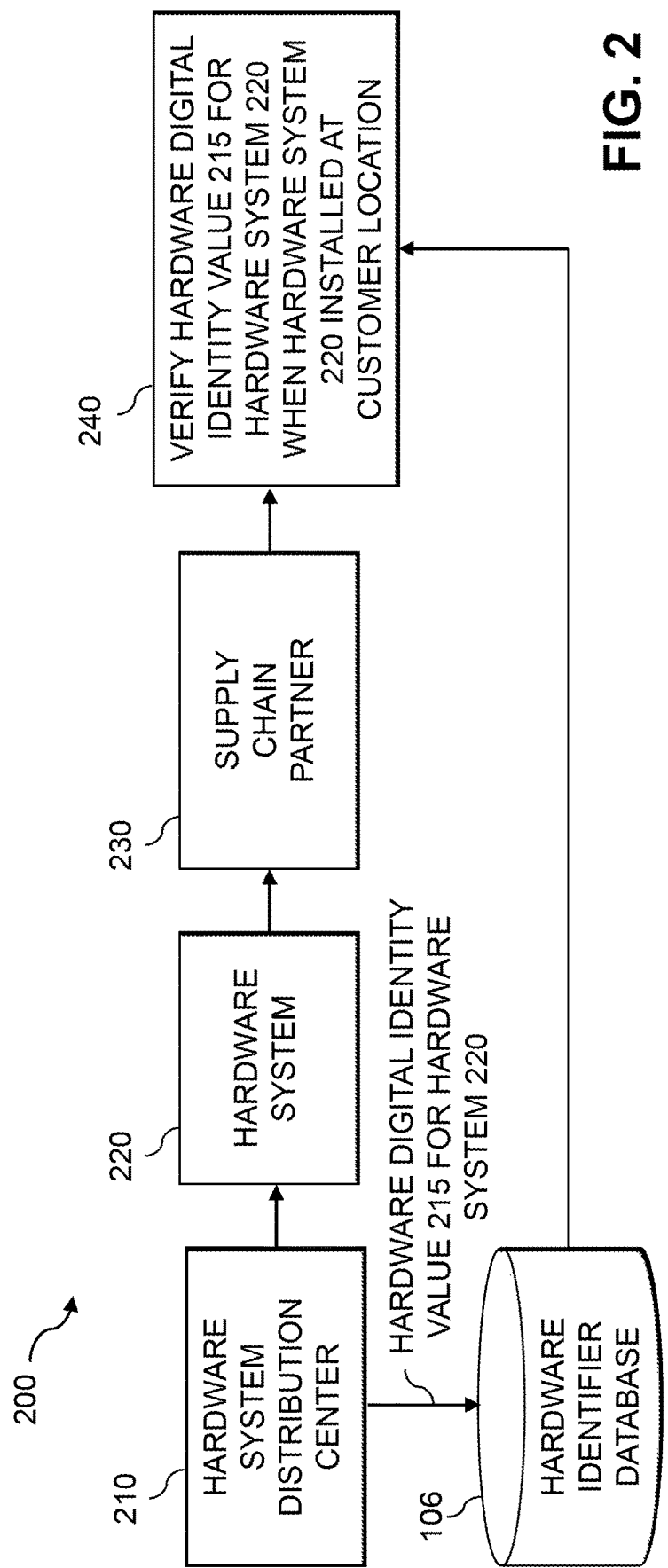
FIG. 2 illustrates a supply chain environment for a hardware system, according to an embodiment of the disclosure.

FIG. 2 illustrates a supply chain environment 200 for a hardware system 220, according to an embodiment of the disclosure. As shown in FIG. 2, an exemplary hardware system distribution center 210 provides the hardware system 220 to a supply chain partner 230, such as a fulfillment and/or shipping partner or another member of the supply chain of the hardware system distribution center 210. The hardware system distribution center 210 may comprise, for example, a fabrication center of a manufacturer, or a storage warehouse for a retailer (e.g., a vendor, seller, or reseller of the hardware system 220).

In conjunction with providing the hardware system 220 to the supply chain partner 230, for example, the hardware system distribution center 210 also generates a hardware digital identity value 215 for the hardware system 220, in accordance with the disclosed hardware system protection techniques. Generally, the hardware system distribution center 210 can protect the hardware system 220 from unauthorized modifications by generating a hardware digital identity value 215 before surrendering control of the hardware system 220 to the supply chain partner 230. In at least some embodiments, the hardware digital identity value 215 is calculated for an inactive state of the hardware system 220.

The generated hardware digital identity value 215 is stored in the hardware identifier database 106 of FIG. 1. The hardware digital identity value 215 may be computed, for example, by applying a hash value to a serial number or another identifier of each hardware element in the hardware system 220. For example, the hash values for each hardware element may be summed and optionally combined with one or more salt values to add complexity to the hardware digital identity value 215. In the case of a hardware element being a sub-system comprising multiple components (e.g., provided by a third party), the hash value may optionally be associated with the sub-system, and not each of the individual components within the sub-system.

In some embodiments, the hardware digital identity value 215 and/or the hash values associated with the hardware elements within the hardware system 220 may be signed using a certificate by a trusted authority. The hardware element identifiers within the hardware system 220 may comprise, for example, central processing unit (CPU) serial numbers, disk serial numbers, and network card serial numbers.

As shown in FIG. 2, at step 240, the hardware digital identity value 215 for the hardware system 220 is verified, for example, when the hardware system 220 is installed, configured and/or activated at a customer location, and/or when the hardware system 220 attempts to access a service over a network. In at least some embodiments, the hardware digital identity value 215 for the hardware system 220 is verified (e.g., by the hardware digital identity verification module 114 of FIG. 1) by computing the hardware digital identity value 215 at the time of verification and comparing the computed verification value with the value previously stored in the hardware identifier database 106. At the time of verification, the hardware system 220 can return either: (i) the hardware identifiers of all components in the hardware system 220, or (ii) the hardware digital identity value for the hardware system 220 as calculated by the hardware system 220 at the time of verification.

In this manner, if one or more of the hardware elements in the hardware system 220 is removed or modified, or if an additional hardware element is inserted into the hardware system 220, the hardware digital identity value 215 will fail the validation and the unauthorized modification of the hardware system 220 will be detected. One or more automated remedial actions can be performed upon detection of an unauthorized modification of the hardware system 220, such as generating a notification to the customer regarding the discovered threat, optionally with one or more suggested solutions, as discussed further below.

Figure 3:
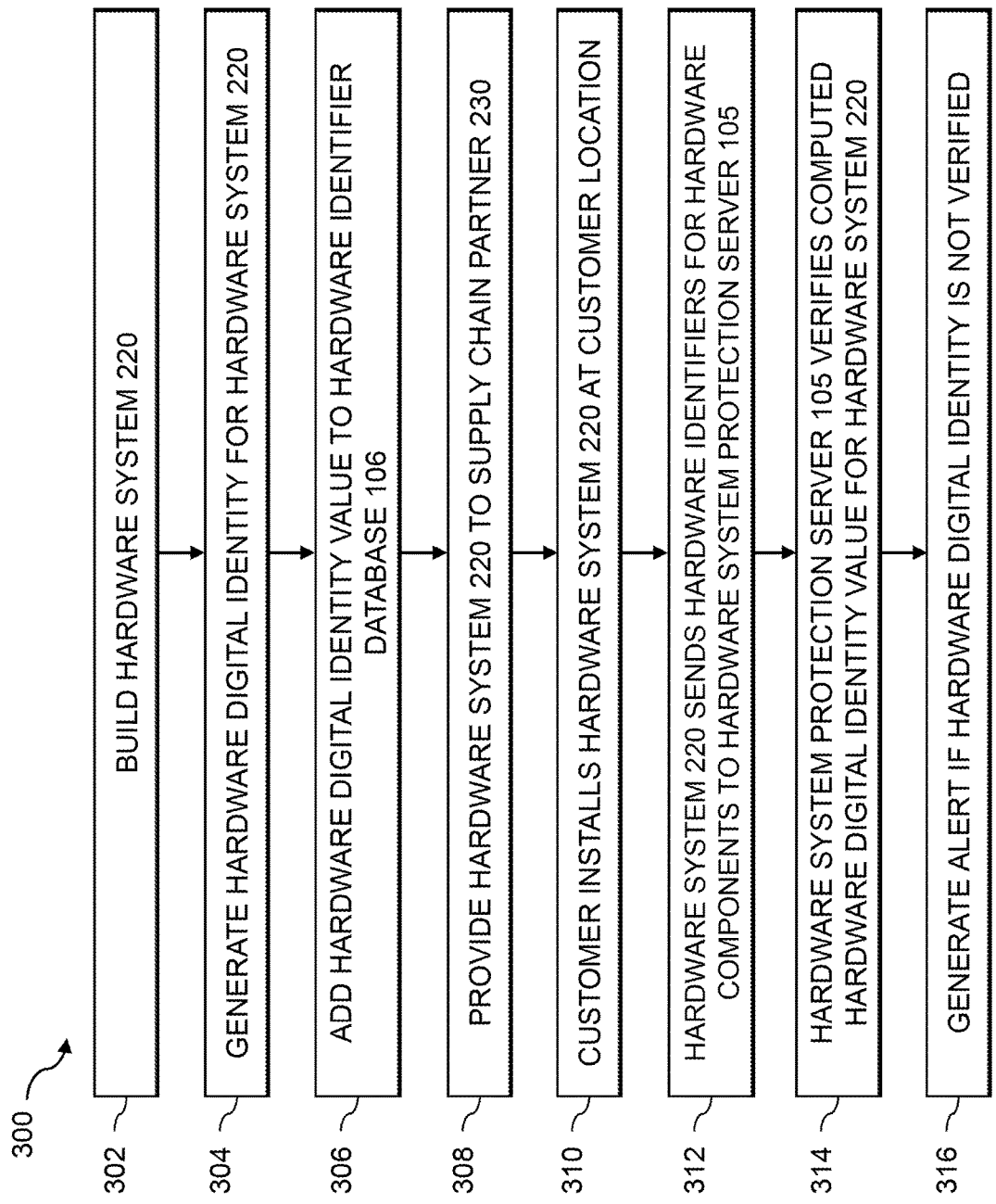
FIGS. 3 and 4 are flow diagrams illustrating exemplary implementations of hardware system protection processes using hardware digital identity value verification, according to various embodiments.

FIG. 3 is a flow diagram illustrating an exemplary implementation of a hardware system protection process 300 using verification of hardware digital identities, according to one or more embodiments. In the example of FIG. 3, the hardware system protection process 300 builds (or otherwise obtains) the hardware system 220 in step 302, for example, at the hardware system distribution center 210. In step 304, a hardware digital identity value 215 is generated for hardware system 220, which is added to the hardware identifier database 106 in step 306.

The hardware system 220 is then provided to a supply chain partner 230 in step 308. For example, the hardware system 220 can be shipped to a customer using a shipping partner. In step 310, the customer installs the hardware system 220 at a customer location. In response to the installation, the hardware system 220 sends the hardware identifiers for the hardware components in the hardware system 220 in step 312, for example, to the hardware digital identity verification module 114 of the hardware system protection server 105. The hardware system protection server 105 (e.g., the hardware digital identity verification module 114) then verifies the hardware system 220 in step 314 by computing the hardware digital identity value 215 for the hardware system 220 and comparing the computed value to the value previously stored in the hardware identifier database 106. An alert is generated in step 316 if the hardware digital identity value 215 for the hardware system 220 is not verified.

Figure 4:
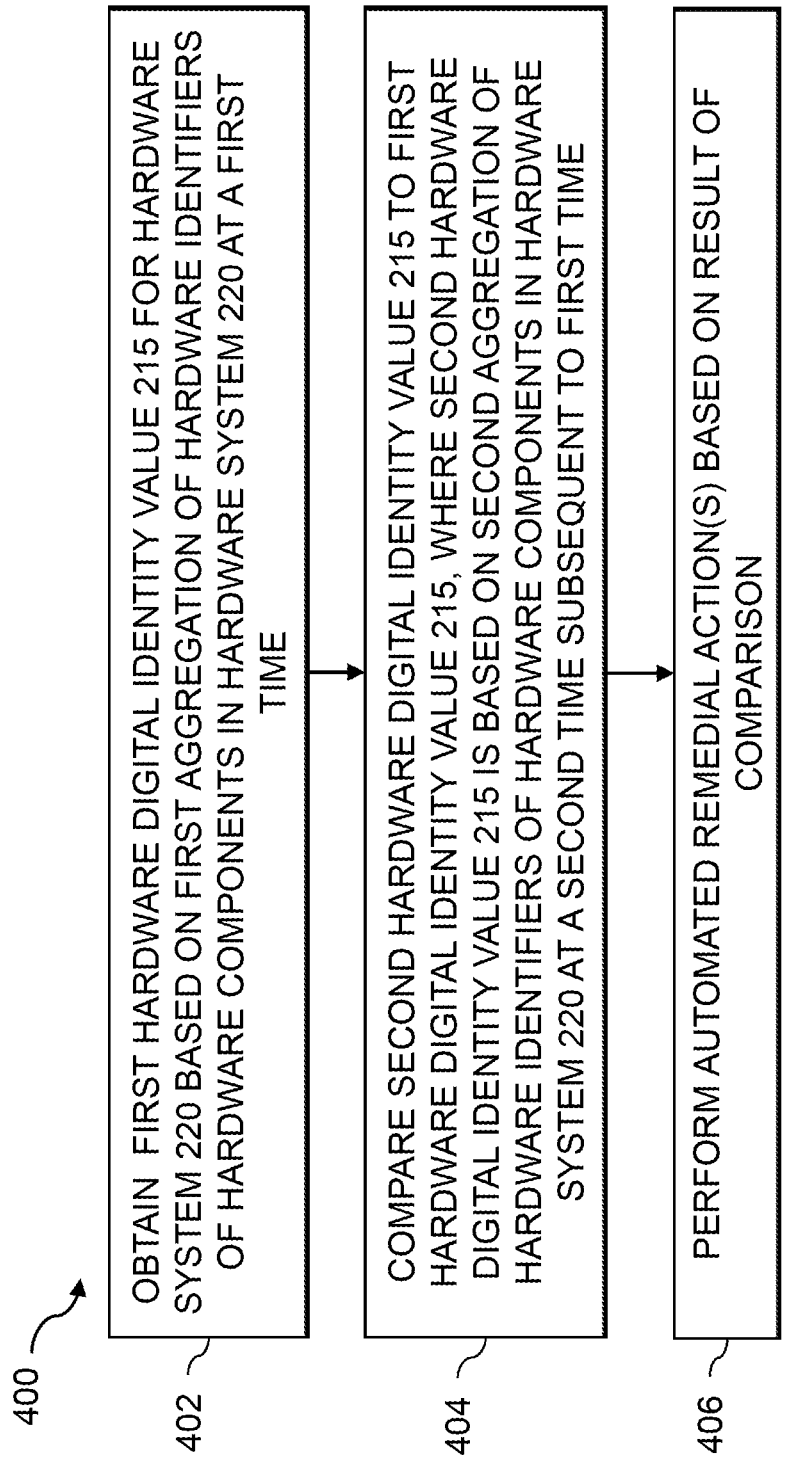

FIG. 4 is a flow diagram illustrating an exemplary implementation of a hardware system protection process 400 that uses a hardware digital identity value to protect a hardware system 220, according to some embodiments of the disclosure. As shown in FIG. 4, the hardware system protection process 400 initially obtains a first hardware digital identity value for the hardware system (e.g., generated by a provider of a hardware system 220) in step 402 based at least in part on a first aggregation of hardware identifiers of a plurality of hardware components in the hardware system 220 at a first time.

In step 404, a second hardware digital identity value 215 is compared to the first hardware digital identity value 215 (e.g., obtained from the hardware identifier database 106). The second hardware digital identity value 215 is based at least in part on a second aggregation of the hardware identifiers of the hardware components in the hardware system 220 at a second time that is subsequent to the first time. In some embodiments, step 404 can be performed in response to receiving the hardware identifiers in the hardware system 220 at the second time from the hardware system 220 (e.g., at a remote location). The hardware system 220 may send, for example, the second hardware digital identity value 215 computed by the hardware system 220 (based on the hardware identifiers of the hardware elements within the hardware system 220 at the second time), or a list of the hardware identifiers of the hardware elements within the hardware system 220 at the second time for computation of the second hardware digital identity value 215 by the hardware digital identity verification module 114, for example.

One or more automated remedial actions are performed in step 406 based on a result of the comparison. For example, if the hardware digital identity value 215 is not verified, the hardware system protection process 400 may detect that one or more unauthorized modifications were made to the hardware system 220 while the hardware system 220 was in the control of a supply chain partner 230, and may generate an alert notification.

As noted above, the first hardware digital identity value may be generated, for example, at a time of manufacture, a time of sale or a time of release of the hardware system 220 and can be stored in the hardware identifier database 106. The second hardware digital identity value may be generated, for example: (i) at a time of the hardware system attempting to connect to at least one service over a network and/or (ii) at a time of the hardware system being one or more of installed, configured and activated at a location remote from a provider of the hardware system.

The particular processing operations and other network functionality described in conjunction with the flow diagrams of FIGS. 3 and 4, for example, are presented by way of illustrative example only, and should not be construed as limiting the scope of the disclosure in any way. Alternative embodiments can use other types of processing operations to protect hardware systems using a hardware digital identity. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

Upon detection of an anomaly with respect to the hardware system 220 (e.g., a failure to validate the hardware digital identity value of the hardware system 220), the hardware system protection server 105 can optionally initiate or execute one or more predefined remedial steps and/or mitigation steps to address the detected anomalies. For example, the predefined remedial steps and/or mitigation steps to address the detected anomalies may comprise the transmission of an alert or alarm to the user device 102 and/or user for important or suspicious events; isolating, removing, quarantining, limiting permissions, analyzing, and deactivating the hardware system 220, one or more of the user devices 102 and/or one or more files, accounts or aspects of the hardware system 220, user devices 102 or the user; notifying one or more third party systems (such as sending an email, or generating an alert in another system); restricting access of one or more accounts and one or more machines or services from accessing a network, files or folders; initiating a step-up authentication with one or more additional authentication factors; resetting or limiting permissions associated with a file or folder; quarantining one or more files or folders, and preventing one or more further actions from being executed associated with the hardware system 220, user devices 102, user account, service or machine associated with the detected anomalous activity.

In this manner, when an unauthorized and/or malicious change is detected for a given protected hardware system, the appropriate manufacturer or vendor can be notified to immediately respond to the attack and further security breaches with the protected hardware system can be mitigated. The impacted protected hardware system can optionally be disabled from further operation or otherwise shutdown to prevent the modified hardware system 220 from harming the data and/or network environment of the customer.

The disclosed techniques for hardware system protection using verification of a hardware digital identity can be employed to verify and authenticate that unauthorized and/or malicious changes were not made to a protected hardware system, for example, while the protected hardware system is in the control of a supply chain partner 230. In this manner, the disclosed techniques for hardware system protection using verification of hardware digital identity values disable the ability of a malicious actor to tamper with a protected hardware system during the supply chain process.

One or more embodiments of the disclosure provide improved methods, apparatus and computer program products for hardware system protection using verification of hardware digital identity values. The foregoing applications and associated embodiments should be considered as illustrative only, and numerous other embodiments can be configured using the techniques disclosed herein, in a wide variety of different applications.

It should also be understood that the disclosed hardware system protection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for hardware system protection using verification of hardware digital identity values may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based hardware system protection engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based hardware system protection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
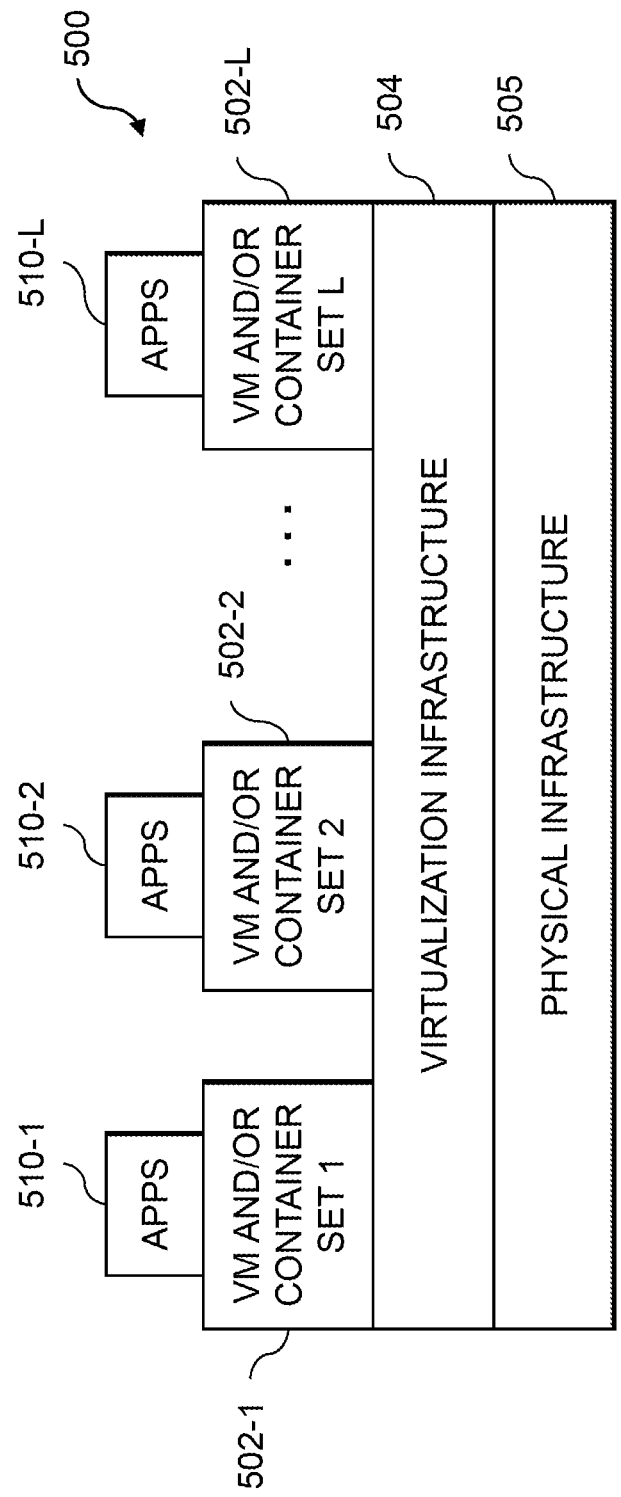
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, ... 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, ... 510-L running on respective ones of the VMs/container sets 502-1, 502-2, ... 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide hardware system protection functionality of the type described above for one or more processes running on a given one of the VMs. For example, each of the VMs can implement hardware system protection control logic and associated hardware digital identity verification functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide hardware system protection functionality of the type described above for one or more processes running on different ones of the containers. For example, a container host device supporting multiple containers of one or more container sets can implement one or more instances of hardware system protection control logic and associated hardware digital identity verification functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, ... 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
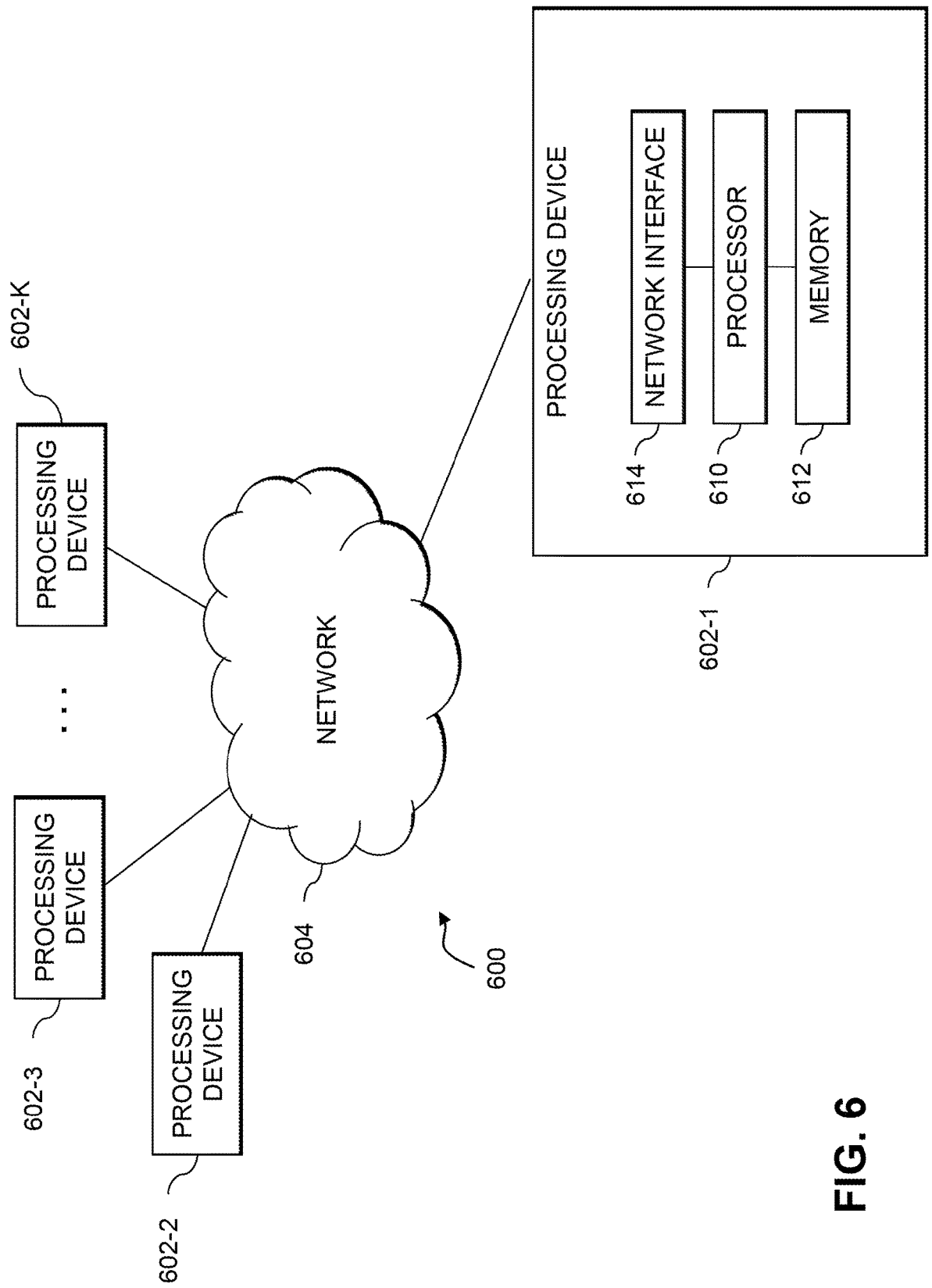
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining a first aggregated hardware digital identity value for a hardware system of a first entity, wherein the first aggregated hardware digital identity value is generated, by at least one processing device of at least one second entity, by applying an aggregation function to respective hardware identifiers of a plurality of hardware components of the hardware system at a first time and at a first location, wherein the aggregation function comprises applying a hash function to the respective hardware identifiers of the plurality of hardware components of the hardware system;
    comparing, by the at least one processing device of the at least one second entity, wherein the at least one second entity is different than the first entity, a second aggregated hardware digital identity value to the first aggregated hardware digital identity value, wherein the second aggregated hardware digital identity value is generated by applying the aggregation function to the respective hardware identifiers of the plurality of hardware components of the hardware system at a second time that is subsequent to the first time and at a second location that is different than the first location, wherein the comparison of the first aggregated hardware digital identity value and the second aggregated hardware digital identity value detects a change in one or more of the hardware components of the hardware system between the first location and the second location, wherein the second time, for generating the second aggregated hardware digital identity value used in the comparison, corresponds to a time of the hardware system being one or more of installed, configured and activated at a location of the first entity, wherein the first aggregated hardware digital identity value is stored, by the at least one processing device of the at least one second entity, remotely from the second location, wherein the hardware system of the first entity, at the second time, sends the at least one processing device of the at least one second entity one or more of (i) the respective hardware identifiers of the plurality of hardware components of the hardware system at the second time, for computation of the second aggregated hardware digital identity value of the hardware system at the second time by the at least one processing device of the at least one second entity using the aggregation function and the respective hardware identifiers of the plurality of hardware components of the hardware system at the second time and (ii) the second aggregated hardware digital identity value of the hardware system, computed by at least one processing device of the first entity at the second time, using the aggregation function and the respective hardware identifiers of the plurality of hardware components of the hardware system at the second time, wherein the at least one processing device of the at least one second entity (a) obtains the first aggregated hardware digital identity value stored remotely from the second location and (b) performs the comparison that detects the change in the one or more hardware components of the hardware system between the first location and the second location; and
    performing one or more automated actions based at least in part on a result of the comparison;
    wherein the at least one processing device comprises a processor coupled to a memory.

2. The method of claim 1, wherein the first time corresponds to one or more of: a time of manufacture, a time of sale and a time of release of the hardware system.

3. The method of claim 2, further comprising storing the first aggregated hardware digital identity value for the hardware system at the first time.

4. The method of claim 1, wherein the aggregation function comprises one or more of digitally signing a serial number of one or more hardware components and hashing a serial number of one or more hardware components.

5. The method of claim 1, wherein the applying the aggregation function comprises: (i) applying the hash function to the hardware identifier associated with each of the plurality of hardware components in the hardware system to obtain corresponding hash values, and (ii) aggregating the corresponding hash values.

6. The method of claim 1, wherein the hardware system, at the second time, calculates the second aggregated hardware digital identity value of the hardware system and sends the second aggregated hardware digital identity value to the at least one processing device.

7. The method of claim 1, wherein the applying the hash function to the respective hardware identifiers of the plurality of hardware components in the hardware system comprises obtaining hash values for each of the plurality of hardware components in the hardware system and aggregating the hash values.

8. An apparatus comprising:
    at least one processing device comprising a processor coupled to a memory;
    the at least one processing device being configured to implement the following steps:
    obtaining a first aggregated hardware digital identity value for a hardware system of a first entity, wherein the first aggregated hardware digital identity value is generated, by at least one processing device of at least one second entity, by applying an aggregation function to respective hardware identifiers of a plurality of hardware components of the hardware system at a first time and at a first location, wherein the aggregation function comprises applying a hash function to the respective hardware identifiers of the plurality of hardware components of the hardware system;

comparing, by the at least one processing device of the at least one second entity, wherein the at least one second entity is different than the first entity, a second aggregated hardware digital identity value to the first aggregated hardware digital identity value, wherein the second aggregated hardware digital identity value is generated by applying the aggregation function to the respective hardware identifiers of the plurality of hardware components of the hardware system at a second time that is subsequent to the first time and at a second location that is different than the first location, wherein the comparison of the first aggregated hardware digital identity value and the second aggregated hardware digital identity value detects a change in one or more of the hardware components of the hardware system between the first location and the second location, wherein the second time, for generating the second aggregated hardware digital identity value used in the comparison, corresponds to a time of the hardware system being one or more of installed, configured and activated at a location of the first entity, wherein the first aggregated hardware digital identity value is stored, by the at least one processing device of the at least one second entity, remotely from the second location, wherein the hardware system of the first entity, at the second time, sends the at least one processing device of the at least one second entity one or more of (i) the respective hardware identifiers of the plurality of hardware components of the hardware system at the second time, for computation of the second aggregated hardware digital identity value of the hardware system at the second time by the at least one processing device of the at least one second entity using the aggregation function and the respective hardware identifiers of the plurality of hardware components of the hardware system at the second time and (ii) the second aggregated hardware digital identity value of the hardware system, computed by at least one processing device of the first entity at the second time, using the aggregation function and the respective hardware identifiers of the plurality of hardware components of the hardware system at the second time, wherein the at least one processing device of the at least one second entity (a) obtains the first aggregated hardware digital identity value stored remotely from the second location and (b) performs the comparison that detects the change in the one or more hardware components of the hardware system between the first location and the second location; and performing one or more automated actions based at least in part on a result of the comparison.

9. The apparatus of claim 8, wherein the first time corresponds to one or more of: a time of manufacture, a time of sale and a time of release of the hardware system.

10. The apparatus of claim 9, further comprising storing the first aggregated hardware digital identity value for the hardware system at the first time.

11. The apparatus of claim 8, wherein the aggregation function comprises one or more of digitally signing a serial number of one or more hardware components and hashing a serial number of one or more hardware components.

12. The apparatus of claim 8, wherein the applying the aggregation function comprises: (i) applying the hash function to the hardware identifier associated with each of the plurality of hardware components in the hardware system to obtain corresponding hash values, and (ii) aggregating the corresponding hash values.

13. The apparatus of claim 8, wherein the hardware system, at the second time, calculates the second aggregated hardware digital identity value of the hardware system and sends the second aggregated hardware digital identity value to the at least one processing device.

14. The apparatus of claim 8, wherein the applying the hash function comprises obtaining hash values for each of the plurality of hardware components in the hardware system and aggregating the hash values.

15. A non-transitory processor-readable storage medium having stored therein program code of one or more software programs, wherein the program code when executed by at least one processing device causes the at least one processing device to perform the following steps:

obtaining a first aggregated hardware digital identity value for a hardware system of a first entity, wherein the first aggregated hardware digital identity value is generated, by at least one processing device of at least one second entity, by applying an aggregation function to respective hardware identifiers of a plurality of hardware components of the hardware system at a first time and at a first location, wherein the aggregation function comprises applying a hash function to the respective hardware identifiers of the plurality of hardware components of the hardware system;

comparing, by the at least one processing device of the at least one second entity, wherein the at least one second entity is different than the first entity, a second aggregated hardware digital identity value to the first aggregated hardware digital identity value, wherein the second aggregated hardware digital identity value is generated by applying the aggregation function to the respective hardware identifiers of the plurality of hardware components of the hardware system at a second time that is subsequent to the first time and at a second location that is different than the first location, wherein the comparison of the first aggregated hardware digital identity value and the second aggregated hardware digital identity value detects a change in one or more of the hardware components of the hardware system between the first location and the second location, wherein the second time, for generating the second aggregated hardware digital identity value used in the comparison, corresponds to a time of the hardware system being one or more of installed, configured and activated at a location of the first entity, wherein the first aggregated hardware digital identity value is stored, by the at least one processing device of the at least one second entity, remotely from the second location, wherein the hardware system of the first entity, at the second time, sends the at least one processing device of the at least one second entity one or more of (i) the respective hardware identifiers of the plurality of hardware components of the hardware system at the second time, for computation of the second aggregated hardware digital identity value of the hardware system at the second time by the at least one processing device of the at least one second entity using the aggregation function and the respective hardware identifiers of the plurality of hardware components of the hardware system at the second time and (ii) the second aggregated hardware digital identity value of the hardware system, computed by at least one processing device of the first entity at the second time, using the aggregation function and the respective hardware identifiers of the plurality of hardware components of the hardware system at the second time, wherein the at least one processing device of the at least one second entity (a) obtains the first aggregated hardware digital identity value stored remotely from the second location and (b) performs the comparison that detects the change in the one or more hardware components of the hardware system between the first location and the second location; and performing one or more automated actions based at least in part on a result of the comparison.

16. The non-transitory processor-readable storage medium of claim 15, wherein the first time corresponds to one or more of: a time of manufacture, a time of sale and a time of release of the hardware system.

17. The non-transitory processor-readable storage medium of claim 15, wherein the aggregation function comprises one or more of digitally signing a serial number of one or more hardware components and hashing a serial number of one or more hardware components.

18. The non-transitory processor-readable storage medium of claim 15, wherein the applying the aggregation function comprises: (i) applying the hash function to the hardware identifier associated with each of the plurality of hardware components in the hardware system to obtain corresponding hash values, and (ii) aggregating the corresponding hash values.

19. The non-transitory processor-readable storage medium of claim 15, wherein the hardware system, at the second time, calculates the second aggregated hardware digital identity value of the hardware system and sends the second aggregated hardware digital identity value to the at least one processing device.

20. The non-transitory processor-readable storage medium of claim 15, further comprising storing the first aggregated hardware digital identity value for the hardware system at the first time.

\* \* \* \* \*